C. W. DAKE.
TURBINE.
APPLICATION FILED MAR. 30, 1921.
1,429,570.
Patented Sept. 19, 1922.
3 SHEETS—SHEET 1.
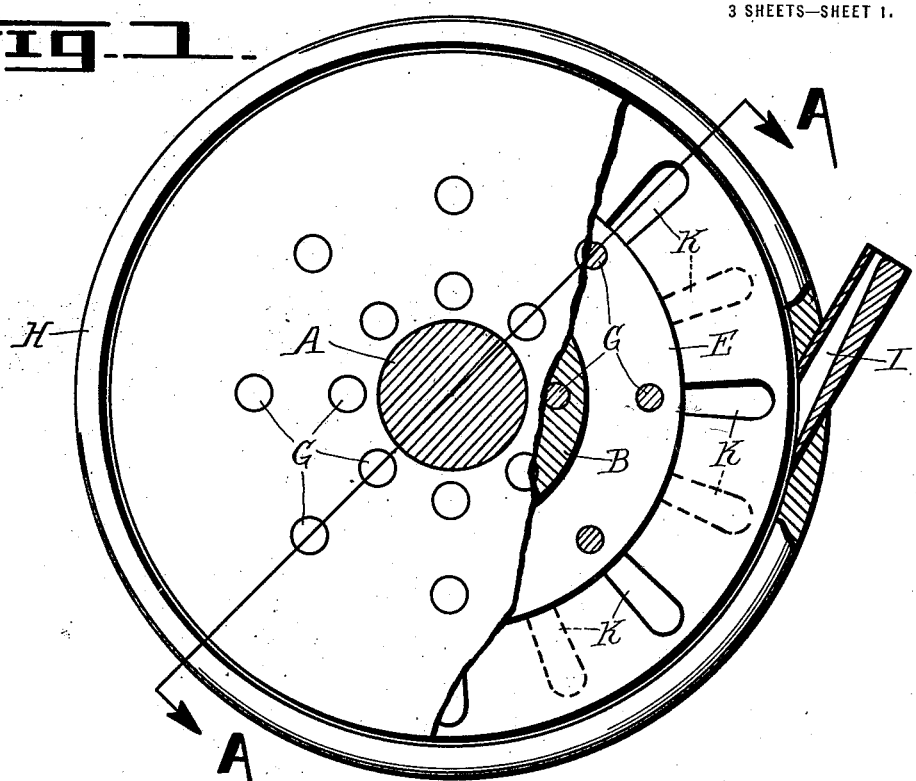
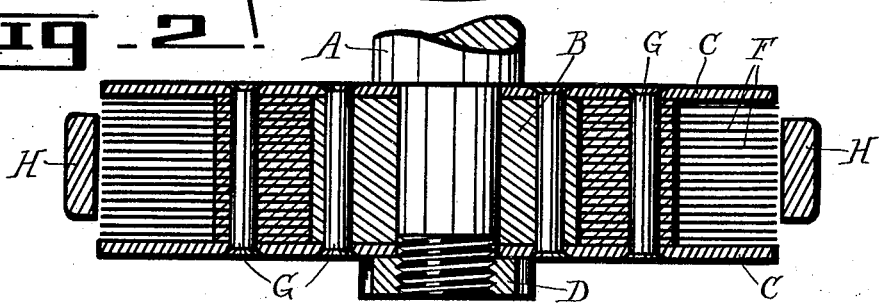
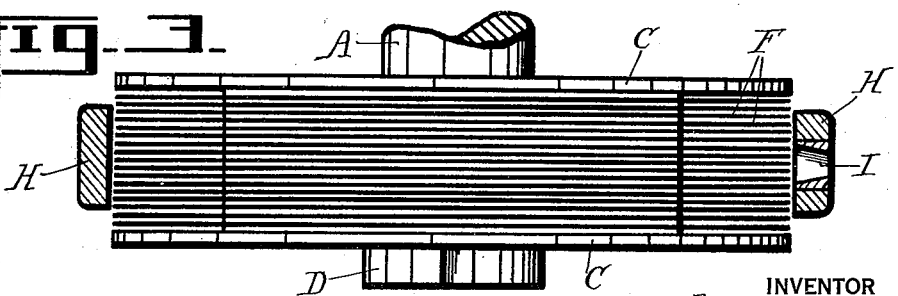
INVENTOR
Charles W. Dake.
BY
Parker & Carter
ATTORNEY C. W. DAKE.
TURBINE.
APPLICATION FILED MAR. 30, 1921.
1,429,570.
Patented Sept. 19, 1922.
3 SHEETS—SHEET 2.
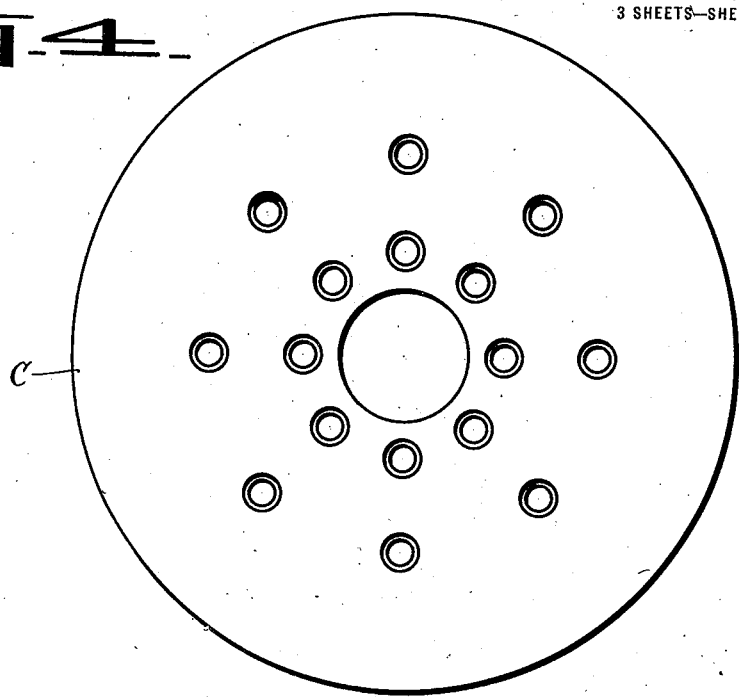
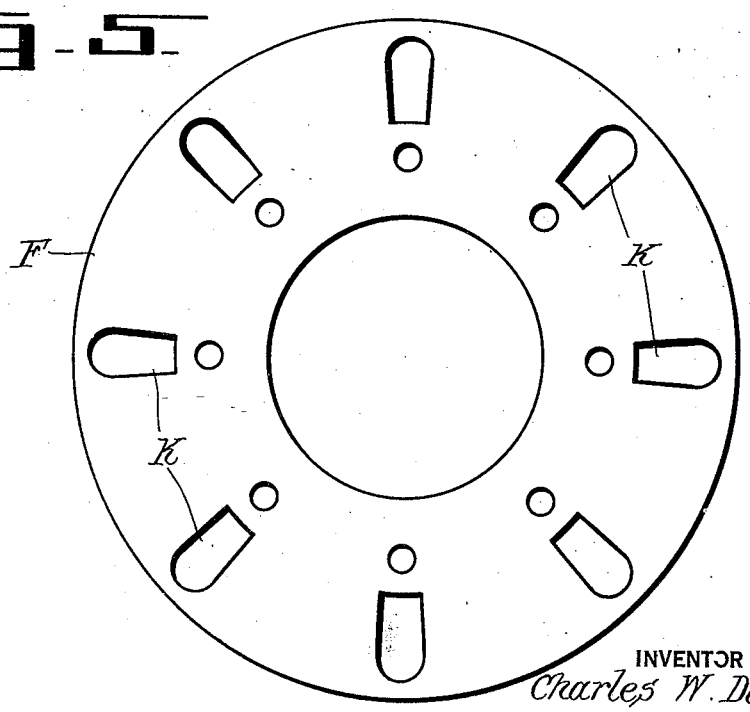
INVENTOR
Charles W. Dake
BY
Parker & Carter
ATTORNEY C. W. DAKE.
TURBINE.
APPLICATION FILED MAR. 30, 1921.
1,429,570. Patented Sept. 19, 1922.
3 SHEETS—SHEET 3.
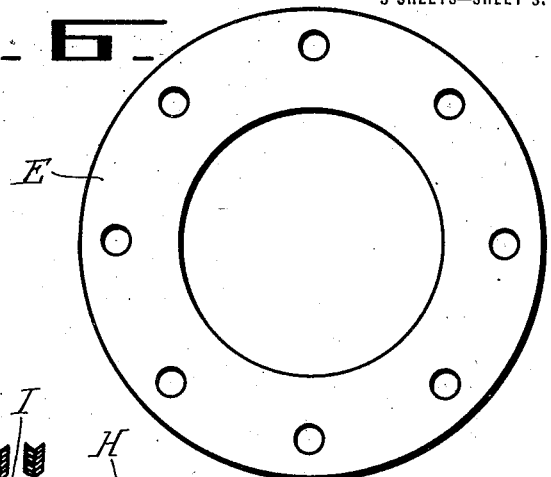
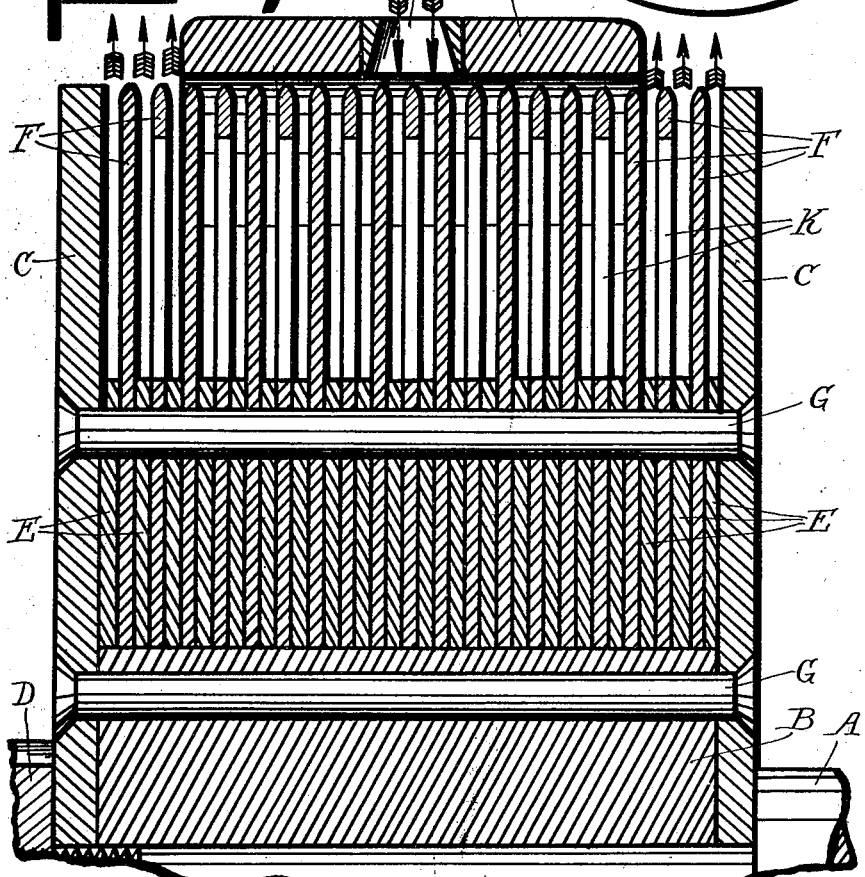
INVENTOR
Charles W. Dake
BY
Parker & Carts
ATTORNEY Patented Sept. 19, 1922.

1,429,570

UNITED STATES PATENT OFFICE.

CHARLES W. DAKE, OF CHICAGO, ILLINOIS, ASSIGNOR TO THE PYLE NATIONAL COMPANY, OF CHICAGO, ILLINOIS, A CORPORATION OF NEW JERSEY.

TURBINE.

Application filed March 30, 1921. Serial No. 456,912.

*To all whom it may concern:*

Be it known that I, CHARLES W. DAKE, a citizen of the United States, residing at Chicago, in the county of Cook and State of Illinois, have invented a certain new and useful Improvement in Turbines, of which the following is a specification.

By invention relates to turbines. It has for one object to provide a new and improved form of turbine structure such as may be operated by elastic fluid such as steam or gas and the like, or by hydraulic fluid, water, oil and the like, and the only difference between the hydraulic and elastic fluid turbines embodying my invention would be in matters of detail and dimension, size and shape of the nozzle and rotational speed. I prefer, however, as a general proposition to drive turbines such as mine by means of elastic fluid.

My turbine comprises in general terms, an apparatus whereby the power of the machine is derived by the friction of the fluid against the side walls of the channels in the rotor, that is to say by the adhesion, and viscosity of rapidly moving fluid against these surfaces, a similar apparatus being described and shown in the copending application Number 456,911.

One object of my invention therefore is to provide such a friction turbine wherein an exceedingly long travel may be given the motive fluid so that there will be ample time for that fluid to give up its speed and be reduced to the same linear speed as the friction surface which it engages before it becomes necessary to discharge the motive fluid from the rotor.

There have been in the past a number of devices wherein frictional engagement of the driving surfaces by the motive fluid was relied upon for the purpose of developing the power and my apparatus differs from them in the arrangements whereby a greatly increased length of path may be travelled and whereby the speed of the motive fluid may be drawn by frictional resistance down to the speed of the driven parts with a minimum leakage, wastage and loss and thus it is possible by my arrangement for the fluid to give to the motor the maximum percentage of its kinetic energy, and it is also possible by my arrangement to operate turbines at exceedingly low speeds.

The turbines of my type may be operated at exceptionally low speeds, and the rotor is so constructed as to absorb all of the velocity from a highly efficient nozzle, or, in other words, one which converts the pressure of the steam into velocity and increases that velocity to the maximum within the expansion of the steam from the highest pressure which it may be possible to generate.

My invention is illustrated more or less diagrammatically in the accompanying drawings, wherein:

Figure 1 is an end elevation in part section;

Fig. 2 is a section along the line A—A of Fig. 1;

Fig. 3 is a section through the nozzle and shroud showing the rotor in elevation;

Fig. 4 is a plan view of the end plate;

Fig. 5 is a plan view of one of the friction driving disks;

Fig. 6 is a plan view of one of the annular spacing rings;

Fig. 7 is a section on an enlarged scale.

A is the turbine shaft; B, a hub thereon. C, C are end plates inclosing the hub mounted on the shaft and held in position by the nut D. E, E are annular spacing members mounted on the hub B. F, F are annular driving disks interposed between the spacing rings and mounted on the hub B. The hub end plates and spacing and driving rings are all held in position by the holding pins or rivets G. H is a shroud surrounding the rotor and shorter, measured in an axial direction, than the rotor. I is a nozzle adapted to discharge steam or other motive fluid through the shroud against the edges of the disks and into the space between them. K, K are a series of perforations in the driving disks arranged between the peripheries of the disks and the peripheries of the spacing rings. It will be noted that there are a number of such perforations.

When steam is discharged through the nozzle against the rotor into the space between the driving disks, it first fills the annular spaces in line with the nozzle, and since it is discharged tangentially the frictional engagement of the motive fluid, which is preferably steam, and the disks tends to cause rotation of the rotor. As soon as the spaces in line with the nozzle fill up steam overflows through all the ports in both directions into the next annular channels or chambers, and as each chamber is filled or commences to fill steam passes on to the next chamber through a tortuous or labyrinthine path, because, as shown, the perforations in the driving disks or plates are not in line. Thus all the steam chambers in the rotor will be filled with steam moving at relatively high linear velocities, and held in the rotor by the shroud. The steam will gradually work out axially in both directions until it escapes from beneath the shroud, by which time it will have given up substantially all its kinetic energy, owing to its frictional resistance against the walls of the relatively narrow steam chambers.

I claim:

1. In a turbine, a plurality of parallel annular motive fluid chambers, connections between them, and means for conducting motive fluid through said chambers successively, there being a plurality of connections between adjacent chambers.

2. In a turbine, a plurality of parallel annular motive fluid chambers, connections between them, and means for conducting motive fluid through said chambers successively, there being a plurality of connections between adjacent chambers, the connections between each pair of chambers being out of line with the connections between the adjacent chambers.

3. In a fluid turbine, a plurality of annular motive fluid chambers, a plurality of separate connections between said chambers, said connections being staggered, and means for discharging motive fluid into some of said chambers and for holding it in the system until it has passed through all of them.

4. In a fluid turbine, a plurality of annular driving disks, a shroud surrounding them to form closed annular motive fluid chambers, a plurality of apertures in said disks to connect adjacent chambers, and means for discharging motive fluid into some of said chambers and conducting it thence to and through all of them.

5. In a fluid turbine, a plurality of annular driving disks, a shroud surrounding them to form closed annular motive fluid chambers, a plurality of apertures in said disks to connect adjacent chambers, and means for discharging motive fluid into some of said chambers and conducting it to and through all of them, the connections between adjacent chambers being out of line.

6. In a turbine, a plurality of parallel annular motive fluid chambers, connections between them, and means for conducting motive fluid through said chambers successively, there being a plurality of connections between adjacent chambers, and means for directing a stream of motive fluid tangentially into some of said chambers.

7. In a turbine, a plurality of parallel annular motive fluid chambers, connections between them, and means for conducting motive fluid through said chambers successively, there being a plurality of connections between adjacent chambers, and means for directing a stream of motive fluid tangentially into said chambers at a point substantially midway between the ends of said turbine.

8. In a turbine, a plurality of parallel annular motive fluid chambers, connections between them, and means for conducting motive fluid through said chambers successively, there being a plurality of connections between adjacent chambers, and a fluid outlet adjacent the end of the turbine.

9. In a fluid turbine, a plurality of annular driving discs, a shroud surrounding them to form closed annular motive fluid chambers, a plurality of apertures in said discs to connect adjacent chambers, and means for discharging motive fluid into one of said chambers and conducting it thence to and through all of them, said shroud being of less length than the turbine.

10. In a fluid turbine, a plurality of annular driving discs, a shroud surrounding them to form closed annular motive fluid chambers, a plurality of apertures in said discs to connect adjacent chambers, and means for discharging motive fluid into one of said chambers and conducting it thence to and through all of them, said shroud being of less length than the turbine, and fluid outlets about the ends thereof.

11. In a turbine, a plurality of parallel annular motive fluid chambers and means for directing motive fluid tangentially into some of them, connections between them, and means for conducting the motive fluid successively through said chambers, there being a plurality of connections between adjacent chambers.

Signed at Chicago, county of Cook, and State of Illinois, this 21st day of March, 1921.

CHARLES W. DAKE.